United States Patent [19]

Namiki

[11] Patent Number: 4,479,258
[45] Date of Patent: Oct. 23, 1984

[54] CROSS-POLARIZATION CROSSTALK CANCELLER

[75] Inventor: Junji Namiki, Tokyo, Japan

[73] Assignee: Nippon Electric Co., Ltd., Tokyo, Japan

[21] Appl. No.: 416,112

[22] Filed: Sep. 9, 1982

[30] Foreign Application Priority Data

Sep. 30, 1981 [JP] Japan .................. 56-153970
Sep. 30, 1981 [JP] Japan .................. 56-153971

[51] Int. Cl.$^3$ ............................. H04B 1/12
[52] U.S. Cl. ........................ 455/295; 343/361; 455/60; 455/305
[58] Field of Search ............ 455/60, 63, 65, 303, 455/305, 306, 295; 375/100, 102; 370/6; 343/100 PE

[56] References Cited

U.S. PATENT DOCUMENTS 3,646,448 2/1972 Harmon, Jr. et al. .......... 455/60
3,986,123 10/1976 Tirró et al. .................... 455/60

OTHER PUBLICATIONS

A Simple Adaptive Equalizer for Efficient Data Transmission, by: Donald Hirsch and W. J. Wolf, IEEE Transactions on Communication Technology, vol. Com. 18, No. 1, Feb., 1970.
Adaptive Receiver for Cross-Polarized Digital Transmission, by: Junji Namiki and Shigeru Takahara, International Conference on Communications, Jun. 14-18, 1981.
New Automatic Polarization Cancelling Control for Multiple-Station Satellite Communication Systems, by: Lin-shan Lee, Ph.D, International Conference on Communications, Jun. 4-7, 1978.

Primary Examiner—Marc E. Bookbinder
Attorney, Agent, or Firm—Laff, Whitesel, Conte & Saret

[57] ABSTRACT

A cross-polarization crosstalk canceller is equipped to receive two polarized waves which are orthogonally crossing each other. The cross-polarization interference is eliminated by multiplying the signal received on one side by a compensating coefficient and adding the resulting product to the signal received on the other side. A discrimination error represents the difference between the reception signal after compensation and the identified value thereof. An adder and a subtractor supplies the sum and the difference between the real part and the imaginary part of the discrimination error. A discriminator detects equality between the absolute values of the real part and the imaginary part of the signal received on the interfering polarized wave side and supplies a control signal depending on the quadrant to which the signal belongs. A switch combines and varies a combination of the signs of the outputs of the adder and subtractor in response to the control signal supplied by the discriminator. A low-pass filter smooths the output of the switching in order to give the compensation coefficient.

6 Claims, 7 Drawing Figures

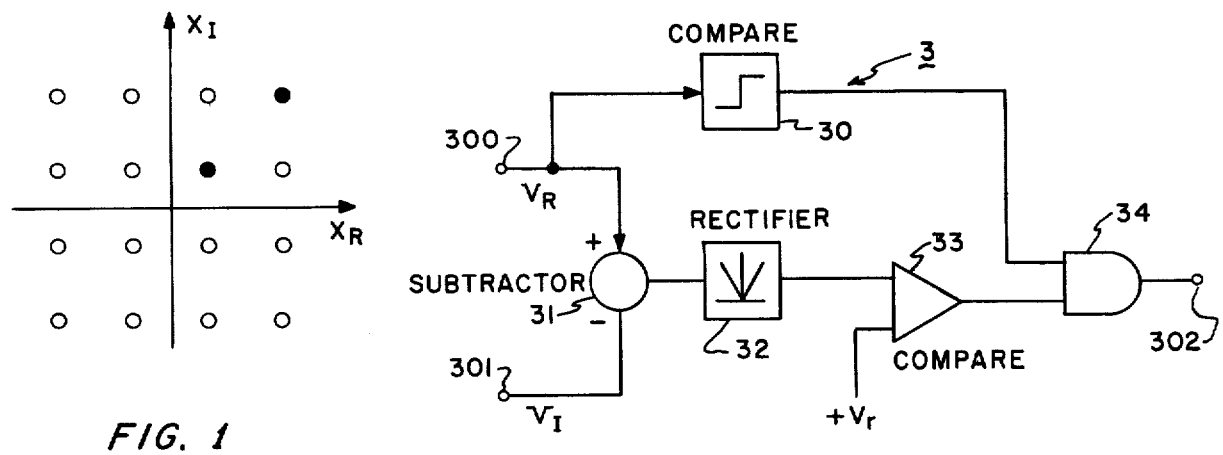
FIG. 1
FIG. 2
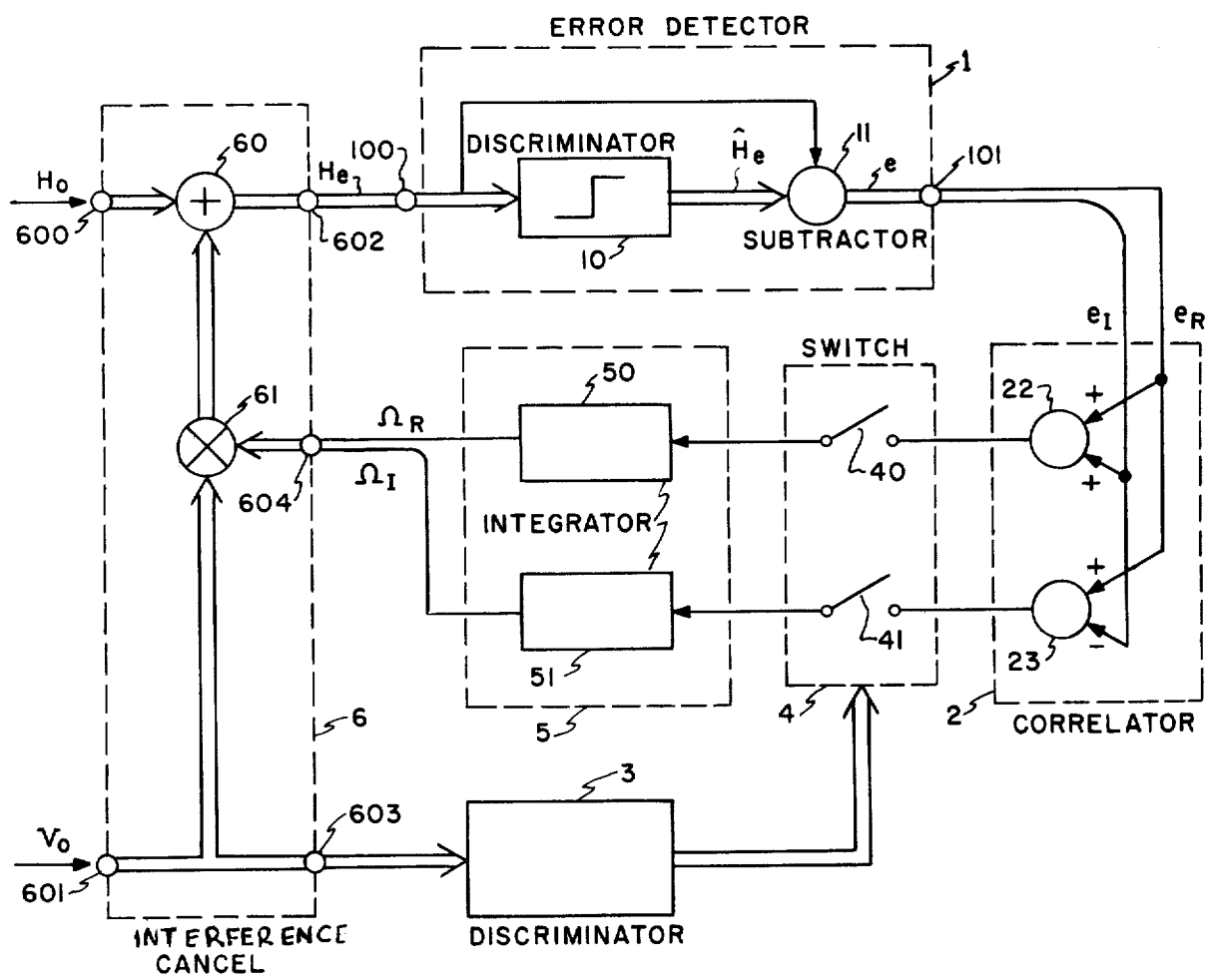
FIG. 3

CROSS-POLARIZATION CROSSTALK CANCELLER

The present invention relates to a circuit for cancelling cross-polarization interference which occurs in high-frequency digital transmission over a microwave relay link or the like and, more particularly, to a crosstalk canceller for used in a receiver for such a communication system.

Microwave systems have made a rapid progress, not only in terrestrial, but also in satellite communications. The need for radio communication is also expected to expand broadly into a mobile communication service. Hence, there is an increasing need for the reuse of currently utilized frequency bands, in addition to the exploitation of quasi-millimeter wave bands. Already, the recommendation of the International Radio Consultative Committee (CCIR) concerning the frequency channel allocation for 4 to 6 GHz frequency-modulated (FM) transmission has expressly urged the use of the cross-polarization technique. In the field of satellite communication, also, the International Telecommunications Satellite Organization (INTELSAT) is likely to adopt in its INTELSAT V series of satellites a cross-polarization sharing technique (instead of a single polarization technique) to share one allocated frequency in the 4 to 6 GHz band.

Free space enables independent, simultaneous transmission of cross-polarized waves through two independent paths. However, rainfall or some other phenomenon causes anisotropy in the actual transmission paths. Therefore, cross-coupling causes an unfavorable interference between the cross-polarized waves (i.e., depolarization) if a cross-polarization sharing system is used.

To achieve such a cross-polarization sharing system in a satisfactory way, a cross-polarization crosstalk cancellation technique is employed to compensate for the deterioration of polarization performance in microwave propagation, which deterioration may be caused by rainfall or the like. Cross-polarization interference is automatically cancelled with a crosstalk canceller provided in an antenna feed system or a receiver.

Analog transmission (mainly by FM transmission) has been used in the microwave band communication. For a practical system for cancelling cross-polarization crosstalk over analog transmission, reference may be made to a paper by Linshan Lee, entitled "New Automatic Polarization Cancelling Control for Multiple-Station Satellite Communication System," published in 1978 in the Conference Record of the International Conference on Communications, pp. 43.3.1–43.3.5 ("Reference 1"). However, the Lee system is intended for analog transmission and requires the insertion of a special pilot signal for the elimination of cross-polarization interference. As a result, the Lee system cannot properly eliminate interference between cross-polarized waves.

The recent trend toward the digital transmission, even in the microwave region, has greatly enhanced the need for a more efficient technique for the cancellation of cross-polarization interference, which may be based on the characteristics of the digital transmission.

According to a prior art technique for this purpose, two polarized waves orthogonally crossing each other are received. The interference component is eliminated by multiplying the signal received on one side (the interfering side) by a compensating coefficient and subtracting the resulting product from the signal received on the other side (the desired signal side). For instance, if data H and V, which are independent of each other, are carried by a horizontally polarized wave and a vertically polarized wave, respectively, the reception signal Ho carried by the vertically polarized wave, will have undergone cross-polarization interferences $\alpha V$ and $\beta H$ during the propagation of the waves:

$$Ho = H + \alpha V \quad (1)$$

$$Vo = V + \beta H \quad (2)$$

Supposing that it is desired to receive data H, the usual practice is to obtain an interference-eliminated signal He by multiplying the signal Vo received on the vertically polarized wave by a compensating coefficient $\Omega$ and then adding the resulting product to the signal Ho received on the horizontally polarized wave. Thus, $$He = Ho + \Omega Vo \quad (3)$$

Hence, $$He = H + \alpha V + \Omega(V + \beta H) = H + (\alpha + \Omega)V + \Omega \cdot \beta \cdot H \approx H + (\alpha + \Omega)V \quad (4)$$

Thus, by making $\alpha$ equal to $-\Omega$, $$He \approx H \quad (5)$$

the cross-polarization interference can be eliminated. In this process, $\Omega$ is usually so controlled that the following equation is held:

$$\Omega^{(i+1)} = \Omega^{(i)} - kVo^* \cdot (He - \hat{H}e) \quad (6)$$

where Vo* expresses a complex conjugate of Vo, and K is a small positive constant.

For further details of this control, reference is made to a paper by Donald Hirsch et al., entitled "A Simple Adaptive Equalizer for Efficient Data Transmission" published in IEEE Transactions on Communication Technology, Vol. Com-18, No. 1, Feburary 1970, pp. 5–12 ("Reference 2"). In the foregoing equation, $\hat{H}e$ is the identified value of He, and $He - \hat{H}e$ is the discrimination error e, which involves the interference from the vertically polarized wave. Therefore, if $\Omega$ is controlled in the direction of minimizing the correlation between e and Vo, $\alpha$ will be made equal to $-\Omega$ to eliminate the interference. For further details of this system, reference is made to a paper by J. Namiki, entitled "Adaptive Receiver for Cross-Polarized Digital Transmission" published in the Conference Record of the International Conference on Communications, June 1981, pp. 46.3.1–46.3.5 ("Reference 3").

However, Vo*·e is a complex multiplication requiring an expensive analog multiplier, which is very expensive if its transmission rate is particularly high.

An object of the present invention is therefore, to provide a simplified, inexpensive cross-polarization crosstalk canceller which is free from the above disadvantages.

According to the invention, a cross-polarization crosstalk canceller is equipped with cross-polarization interference cancelling means for receiving two polarized waves which orthogonally cross each other. The canceller eliminates cross-polarization interference components by multiplying the signal received on one side by a compensating coefficient and adding the resulting product to the signal received on the other side. A discrimination error detector detects the difference between the reception signal, after compensation by the cancelling means and the identified value thereof. An adder and a subtractor respectively supply the sum and the difference between the real part and the imaginary part of the discrimination error signal, given by the discrimination error detector. A discriminator detects the equality of the absolute values of the real part and the imaginary part of the signal received on the interfering polarized wave side and supplies a control signal depending on the quadrant in which the signal belongs. A switching means varies the combination of the signs of the outputs of the adder and subtractor, in response to the control signal which is supplied by the discriminator. A low-pass filter smooths the output of the switching means, to give the compensation coefficient.

BRIEF DESCRIPTION OF THE FIGURES

Other features and advantages of the present invention will become more apparent from the detailed description given hereunder when taken in conjunction with the accompanying drawings, wherein:

FIG. 1 is a diagram showing an arrangement of 16-value quadrature amplitude modulation (16QAM) signal points on the orthogonal phase plane;

FIG. 2 illustrates one example of a discriminator for detecting the signal points shown in FIG. 1;

FIG. 3 is a block diagram of one embodiment of the present invention;

In all these drawings, the same reference numerals represent respectively the same structural elements.

DESCRIPTION OF THE INVENTION

Figure 4:
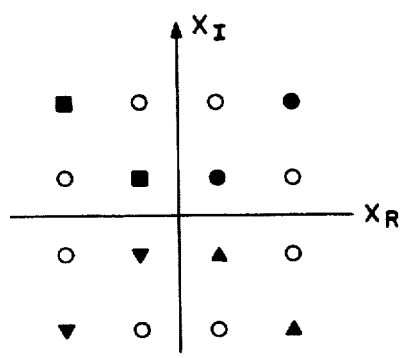
FIG. 4 is a diagram showing another arrangement of 16QAM signal points on the orthogonal phase plane.

First will be described the principle of the present invention. A reception signal $V_o$ has a real part $V_R$ and an imaginary part $V_I$, as represented by the following equation (7). A discrimination error has a real part $e_R$ and an imaginary part $e_I$ as expressed in the following equation (8).

$$V_o = V_R + jV_I \quad (7)$$

$$e = e_R + je_I \quad (8)$$

Hence, $$V_o^* \cdot e = (V_R - jV_I)(e_R + je_I) = (V_R e_R + V_I e_I) + j(V_R e_I - V_I e_R)$$

Now, the following is assumed:

$$V_R = V_I > 0 \quad (9)$$

$$V_o^* \cdot e \alpha (e_R + e_I) + j(e_I - e_R) \quad (10)$$

Therefore, the solution to this Equation (10) can be obtained merely with an adder. Accordingly, by having the value of Equation (10) supplied only when Equation (9) is satisfied and controlling the compensating coefficient therewith, the interference component can be eliminated.

For instance, out of the 16QAM signal points on the orthogonal phase $(X_R - X_I)$ plane shown in FIG. 1, those represented by black dots satisfy Equation (9).

Referring to FIG. 2, a discriminator produces an output when Equation (9) is satisfied. The real part $V_R$ and the imaginary part $V_I$, respectively, of the signal received on the interfering side are supplied to terminals 300 and 301. These parts $V_R$ and $V_I$ undergo a subtraction by a subtractor 31. The absolute value of the output of the subtractor 31 is produced by a rectifier 32, is compared by a comparator 33 having a reference voltage $V_r$ of a positive small value. The comparison reveals whether the absolute value of $V_R$ is equal to or nearly equal to that of $V_I$. Another comparator 30 detects whether the value of $V_R$ is larger than zero. The logical product of the outputs of the comparators 30 and 33 is obtained by an AND circuit 34 and fed to an output terminal 302.

Referring now to FIG. 3, one embodiment of the invention is equipped with cross-polarization interference cancelling means 6 for receiving two polarized waves orthogonally crossing each other and eliminating cross-polarization interference components by multiplying the signal received on one side by a compensating coefficient and then adding the resulting product to the signal received on the other side. A discrimination error detector 1 provides for detecting the difference between the reception signal after compensation by the interference canceller means 6 and for detecting the identified value thereof. A discriminator 3 produces its output when the real component and the imaginary component of the signal received on the interfering side are both positive and equal to each other in magnitude. An adder 22 and a subtractor 23 respectively supply the sum and the difference between the real component and the imaginary component of the output of the detector. A switch pair 4 conducts the outputs of the adder 22 and subtractor 23 depending on the output of the discriminator 3. A low-pass filter (LPF) 5 smooths the output of the switch pair 4 to give the compensation coefficient.

To one input terminal 600 of the interference canceller means 6 is fed, for instance, a horizontally polarized signal Ho, and to the other input terminal 601, a vertically polarized signal Vo. This signal Vo is multiplied by a compensation coefficient $\Omega$ in a multiplier 61, and the product is added to the horizontally polarized signal Ho, in an adder 60. Therefore, an interference-eliminated signal He is given at an output terminal 602. Thus is achieved Equation (3).

The signal He is fed to the input terminal 100 of the detector 1, and is supplied by a discriminator 10 as an identified value Ĥe whose difference from value He is taken by a subtractor 11. A resulting discrimination error e is supplied from a terminal 101.

The real part $e_R$ and the imaginary part $e_I$ of the discriminator error e are added by the adder 22 built into a correlator 2. One of the values ($e_R$, $e_I$) is subtracted from the other by the subtractor 23. The output of the adder 22 gives ($e_R + e_I$) and the output of the subtractor 23 gives ($e_R - e_I$), which appear on the right-hand side of Equation (10). These outputs are respectively supplied to integrators 50 and 51 when the switch pair 4 (switches 40 and 41) are closed, and are smoothed by the integrating action represented by Equation (6).

The switches 40 and 41 are closed depending on the output of the discriminator 3, which is structured as illustrated in FIG. 2 referred to above, and which gives its output only when Equation (9) is satisfied. Therefore, since the switches 40 and 41 are turned on only when Equation (9) is satisfied, the output of the correlator 2 then is proportional to Vo*·e, in accordance with Equation (10). The output of the adder 22 is smoothed by the integrator 50 to give the real part $\Omega_R$ of the compensation coefficient $\Omega$. The output of the subtractor 23 is smoothed by the integrators 51 to give the imaginary part $\Omega_I$ of the compensation coefficient $\Omega$. The integrators 50 and 51 constitute the complex LPF 5. Thus, $\Omega$ in Equation (6) can be obtained without using a multiplier. The compensation coefficient $\Omega$, as stated above, is multiplied with the vertically polarized signal Vo in the multiplier 61. The resulting product is added to the horizontally polarized signal Ho to cancel the cross-polarization interference. The remainder of the compensation, as the discrimination error e, corrects the next compensation coefficient by the above-mentioned action.

However, the control speed is slow in the above-described process because it uses only two points out of, for instance, the 16QAM signal points shown in FIG. 1.

To accelerate the control, more signal points must be utilized. Thus, in a second embodiment, the control speed is raised by utilizing all the groups of signal points satisfying the condition that the absolute value of $V_R$ is equal to that of $V_I$. In the case of 16QAM signals, for example, eight signal points (four pairs) are used, as represented by ● (circle), ■ (square), and ▲, ▼ (triangles) in FIG. 4. It was already stated that signal points marked with circles (●) satisfy Equation (9), and give a signal proportional to Vo*·e in accordance with the right-hand side of Equation (10). For the signal points marked with squares (■), the real number is negative and the imaginary number is positive; Therefore, $$Vo^* \cdot ea - (e_R - e_I) - j(e_R + e_I) \quad (11)$$

For the signal points marked with triangles (▲), $$Vo^* \cdot ea - (e_R + e_I) + j(e_R - e_I) \quad (12)$$

For those marked with triangles (▲), $$Vo^* \cdot ea(e_R - e_I) + j(e_R - e_I) \quad (13)$$

Figure 5:
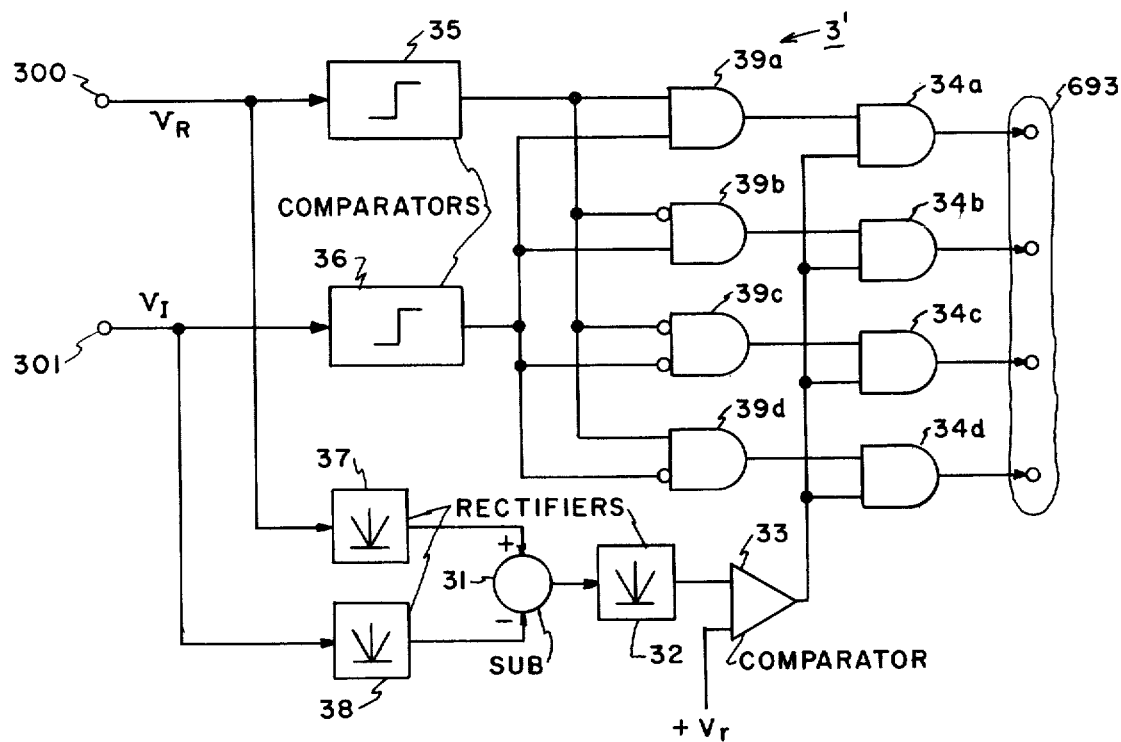
FIG. 5 illustrates an example of another discriminator for detecting the signal points shown in FIG. 4.

A of groups of signal points to satisfy Equations (10) through (13) can be achieved with, for instance, a discriminator 3' shown in FIG. 5. Thus, for example, the real part $V_R$ of the vertically polarized signal Vo is fed to a terminal 300, and its imaginary part $V_I$ to a terminal 301. The signs of the real part $V_R$ and the imaginary part $V_I$ are identified by positive-negative comparators 35 and 36 whose outputs are supplied to AND circuits 39a through 39d. The AND circuit 39a gives a high-level output in response to signal points in the first quadrant, and so do the AND circuits 39b through 39d in response to signal points in the second through fourth quadrants, respectively.

Meanwhile, the real part $V_R$ and the imaginary part $V_I$ are fed to rectifiers 37 and 38 whose outputs are supplied to a subtractor 31 for a subtraction of one, from the other. Comparator 33 compares the output of the subtractor 31 is (supplied through a rectifier 32) with a fixed level 32 to determine whether the absolute value of $V_R$ is equal to or nearly equal to that of $V_I$. The output of the comparator 33 is fed to one side of AND circuits 34a through 34d. The other input side of the AND circuits 34a through 34d are connected to the output terminals of the AND circuits 39a through 39d, respectively.

It is to be noted that each circle marked with the circuits 39b to 39d represents an inversion of a given input. Accordingly, the AND circuit 34a gives a high-level output in response to signal points marked with circles (●) in FIG. 4. The AND circuits 34b through 34d give high level outputs in response to signal points marked with squares (■) and triangles (▼ or ), respectively. Therefore, by combining discrimination errors with these outputs used as control signals, it is possible to formulate the right-hand sides of Equations (10) through (13).

Figure 6:
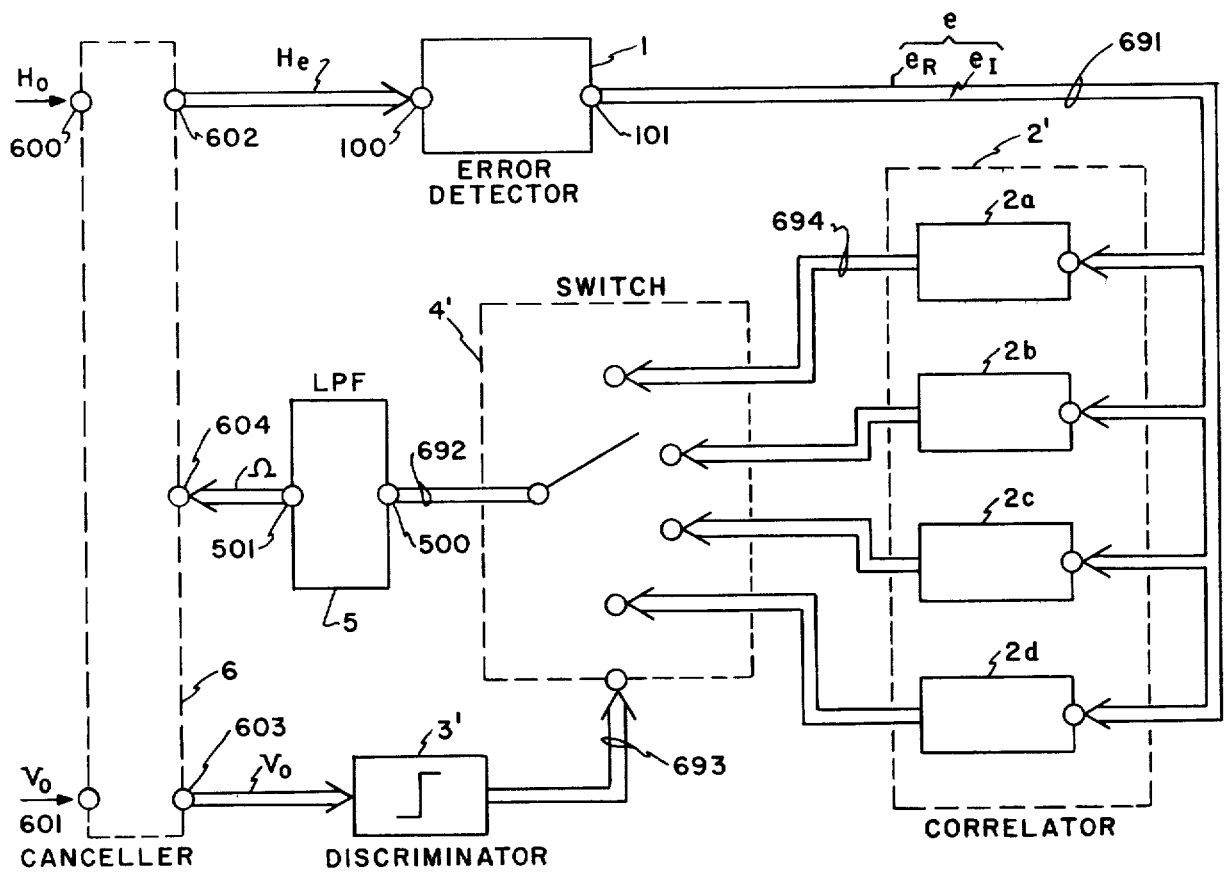
FIG. 6 is a block diagram of a second embodiment of the invention.

Referring to FIG. 6, in the second embodiment, the horizontally polarized signal Ho is fed to a terminal 600, and the vertically polarized signal Vo is supplied to the discriminator 3' through terminals 601 and 603. Control signals corresponding to the condition of these input signals are given to control the opening and closing of switching means 4'.

Meanwhile, the signal Vo is multiplied in a cross-polarization interference canceller 6 by the compensation coefficient $\Omega$ which is fed through a terminal 604. The product is added to the horizontally polarized signal Ho to supply the interference-eliminated signal He from a terminal 602. The signal He is fed to the terminal 100 of the discrimination error detector 1, and from the terminal 101 is supplied the discrimination error e. From the real part $e_R$ and the imaginary part $e_I$ of the discrimination error e are calculated $(e_R + e_I)$ and $(e_R - e_I)$ in correlating means 2a, 2b, 2c, and 2d, which are similar to the correlator 2 in FIG. 3. These corelating means give outputs corresponding to the right-hand sides of Equations (10) through (13), respectively. The switching means 4' selects the output of one of said correlating means corresponding to the control signal given by discriminator 3', and feeds it to the input terminal of a low-pass filter (LPF) 5, which smoothes the input signal and supplies it as the compensation coefficient $\Omega$ through an output terminal 501.

This embodiment can perform the quick control operation, by using eight out of the 16 signal points shown in FIG. 4, for the control of the coefficient $\Omega$. Thus, the embodiment of FIG. 6 can even be responsive to great fluctuations of the interfering polarized wave, and is able to achieve a control speed which is about four times higher than the control speed of the embodiment illustrated in FIG. 3. Accordingly, the FIG. 6 embodiment can quickly and precisely follow variations in polarization interference in satellite communication the variations occur owing to Faraday rotation in outer space.

Figure 7:
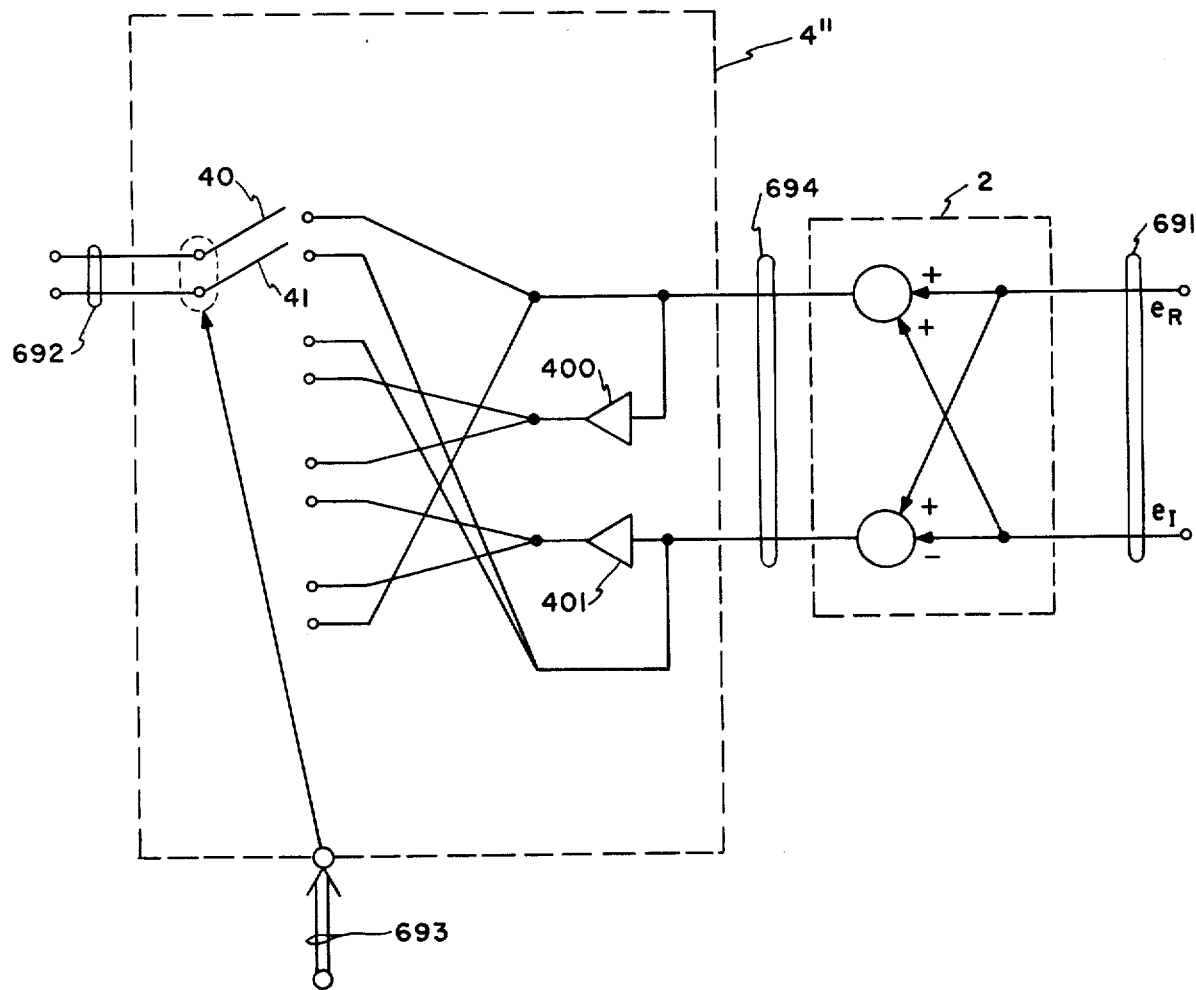
FIG. 7 shows a modification of the second embodiment.

An adder and a subtractor are provided in each of the means 2a, 2b, 2c, and 2d of the correlator 2' in the foregoing second embodiment (FIG. 6) to obtain the right-hand sides of Equations (10) through (13). In these correlating means, if, for instance, switching means 4'', (FIG. 7) is structured to add the two outputs $(e_R + e_I)$ and $(e_R - e_I)$ of the correlator 2 or to subtract one from the other according to the control signal, the correlating means 2b, 2c and 2d in FIG. 6 can be dispensed with, its FIG. 7, its correspondences with FIG. 6 are defined by signal lines 691, 692, 693, and 694. Reference numerals 400 and 401 represent inverters.

As so far described, the present invention provides for a circuit structure in which an adder adds the real part and the imaginary part of the discrimination error and a subtractor to subtracts one from the other when the real part and the imaginary part of the interfering polarized signal are equal to each other in magnitude, the compensation coefficient can be controlled by varying the combination of the outputs of said adder and subtractor according to the quadrant to which the signal belongs. This results in a greater number of signal points being available for use in the control of the compensation coefficient and, accordingly, in a higher control speed. Moreover, since it permits optimal and automatic variation of the compensation coefficient without having to use a multiplier, the structure is remarkably simplified.

What is claimed is:

1. A cross-polarization crosstalk canceller equipped with cross-polarization interference cancelling means for receiving two orthogonally polarized waves, either one of said waves being subject to cross-polarization interference from the other of said waves, each of said polarized waves having a real component and an imaginary component, said interference cancelling means including multiplier means and first adder means for eliminating cross-polarization interference components from by multiplying a first signal received on one of said two polarized waves by a compensating coefficient and by adding the resulting product to a second signal received on the other of said two polarized waves and thereby producing a compensated second signal; discrimination error detector means comprising means for providing an identified value of said compensated second signal and means for providing an error signal equal to the difference between said compensated second signal and said identified value; discriminator means responsive to said one first signal for producing an output signal when the real component and the imaginary component of the first signal are both positive and substantially equal to each other in magnitude; second adder means and subtractor means responsive to said discrimination error detector means for respectively supplying the sum of and a difference between the real component and an imaginary component of the error signal output of said discrimination error detector means; switching means associated with said second adder means and said subtractor means for conducting the outputs of said second adder means and said subtractor means depending on the output of said discriminator means; and a low-pass filter means for smoothing the output of said switching means to give said compensation coefficient, said compensation coefficient being fed back to said multiplier means.

2. A cross-polarization crosstalk canceller equipped with cross-polarization interference cancelling means for receiving two polarized waves, each subject to cross-polarization interference from the other and each of said polarized waves having a real part and an imaginary part, said interference cancelling means including multiplier means and first adder means for eliminating cross-polarization interference components by multiplying a first signal on one of the two waves by a compensating coefficient and adding the resulting product to a second signal received on the other of the two waves; discrimination error detector means responsive to the sum of the added signals for providing an error signal equal to the difference between the sum of the added signals and an identified value of said sum signal said discrimination error detector means comprising means for providing said identified value in response to said sum signal; a plurality of correlator means coupled to an output of said error detector means, each of said correlator means comprising second adder means and a subtractor means for respectively supplying the sum of and the difference between a real part and an imaginary part of the discriminator error signal given by said discrimination error detector means; discriminator means for detecting an approximate equality of the absolute values of the real part and the imaginary part of the first signal received on said one polarized wave and for supplying a control signal according to the quadrant to which the first signal belongs; switching means for supplying the output signal of one of said plurality of correlator means which is selected in response to the control signal supplied by said discriminator means; and a low-pass filter means for smoothing the output of said switching means to give said compensation coefficient.

3. A cross-polarization crosstalk canceller equipped with cross-polarization interference cancelling means for receiving two polarized waves orthogonally crossing each other, each of said polarized waves having a real part and an imaginary part, said interference cancelling means having multiplying means and first adder means for eliminating cross-polarization interference components by multiplying a first signal received on one of said polarized waves by a compensating coefficient and by adding the resulting product to a signal signal received on the other of said polarized waves; discrimination error detectro means for providing an error signal equal to the difference between the sum signal output of said first adder means, and an identified valve derived therefrom, said discrimination error detector means comprising means for providing said identified value in response to said sum signal; second adder means and subtractor means for respectively supplying the sum and the difference between a real part and an imaginary part of the error signal given by said discrimination error detector means; discriminator means for detecting an approximate equality between the absolute values of the real part and the imaginary part of the first signal and for supplying a control signal according to the quadrant to which the first signal belongs; switching means for varying the polarities of the output signals of said second adder means and subtractor means in response to the control signal supplied by said discriminator means; and a low-pass filter means for smoothing the output of said switching means to provide said compensation coefficient.

4. A crosstalk canceller for two cross-polarized orthogonal waves, each of said orthogonal waves having a real component and an imaginary component, said canceller comprising means for multiplying first signals received on one of said two orthogonal waves by a compensating coefficient, first means responsive to said multiplying means for adding the resulting product to second signals received on the other of said two orthogonal waves to produce a sum signal, error detector means responsive to the sum signal output of said adding means for providing an error signal equal to be difference between said sum signal and an value related to said sum signal, means responsive to said sum signal for providing said identified value, second adder means and subtractor means responsive to said error detector means for adding and subtracting real and imaginary components of the error signal, control means responsive to an equality of the absolute values of said real and imaginary components of said first signal for providing a control signal identifying the quadrant to which the first signal belongs, switching means responsive to the control signal for varying the signs of the outputs of said second adder means and said subtractor means, and low-pass filter means for smoothing the output of said switching means to provide said compensating coefficient.

5. The crosstalk canceller of claim 4 wherein said control means provides said control signal for operating said switching means when said control means indicates that the real and imaginary components of said first signal are both positive and substantially equal in magnitude.

6. The crosstalk canceller of claim 4 wherein said second adder means and subtractor means comprises a plurality of adder/subtractor pairs, each of said pairs supplying corresponding sum and difference signals, and means responsive to said control said switching means for selecting one of said pairs.

* * * * *